United States Patent [19]

Carpenter

[11] Patent Number: 4,843,548
[45] Date of Patent: Jun. 27, 1989

[54] SYSTEM FOR INTEGRATING RELATED NUMERICAL FUNCTIONS

[76] Inventor: Robert Carpenter, 15 Willis Dr., Cumberlano, R.I. 02864

[21] Appl. No.: 44,281

[22] Filed: Apr. 30, 1987

[51] Int. Cl.$^4$ ........................ G06F 15/21; G06F 15/30
[52] U.S. Cl. ...................................... 364/406; 364/900
[58] Field of Search ............... 364/408, 300, 401, 406, 364/200 MS File, 900 MS File

[56] References Cited

U.S. PATENT DOCUMENTS

| | | | |
|---|---|---|---|
| 3,749,892 | 7/1973 | Stennings | 364/406 X |
| 4,476,528 | 10/1984 | Matsumoto et al. | 364/300 X |
| 4,597,045 | 6/1986 | Kiuchi | 364/406 |

Primary Examiner—Clark A. Jablon
Attorney, Agent, or Firm—E. A. Siegel

[57] ABSTRACT

The present invention relates to a system for integrating related numerical functions in an improved manner which operates from a common data base. Specifically, this system utilizes a common data base configuration for a variety of separate satellite functions which can then be used independently or in common. The invention is applicable for coordinating and processing business or financial data, and is also suitable for any application involving multiple numerical relationships based on common data variables.

2 Claims, 3 Drawing Sheets

FIG-2

| SELL LEVEL / INVENTORY ITEM | 01 | 02 | 03 | 04 | 05 | 06 | 07 | 08 | 09 | ... |
|---|---|---|---|---|---|---|---|---|---|---|
| 01 | (01,01) | (01,02) | (01,03) | (01,04) | (01,05) | (01,06) | (01,07) | (01,08) | (01,09) | ... |
| 02 | | | | | | | | | | |
| 03 | (03,01) | | | | | | | | | |
| 04 | | | | | | | | | | |
| 05 | | | | (05,04) | | | | | | |
| 06 | | | | | | | | | | |
| 07 | | | | | | | | | | |
| 08 | | | | | | | | | | |
| 09 | | | | | | | | | | |
| 10 | (10,01) | | | | | | | | | |
| 11 | (11,01) | | | | | | | | | |

FIG-3

| $V_1, V_2, V_3,$ $V_4, V_5,$ $V_6, V_n$ | $V_1, V_2, V_3,$ $V_4, V_5,$ $V_6, V_n$ |
|---|---|
| $V_1, V_2, V_3,$ $V_4, V_5,$ $V_6, V_n$ | $V_1, V_2, V_3,$ $V_4, V_5,$ $V_6, V_n$ |

SYSTEM FOR INTEGRATING RELATED NUMERICAL FUNCTIONS

DESCRIPTION OF THE PRIOR ART

The data processing and computer programming fields are being utilized for the maintenance and upkeep of large amounts of financial and scientific data which is then processed to extract and manipulate data for various and often related business or scientific functions. Most systems are developed with a unique data base for a specialized function. Additional, related systems are also designed with a unique data base for their own specialized function. Correlation and linkage between related functions is difficult, error prone, and necessitates large computer memory capacity in order to manipulate and compare various data bases. These systems also require professional staffs to maintain and operate them. Efforts to develop consistency from one numerical function to different, but related functions are time consuming and complex.

SUMMARY OF THE PRESENT INVENTION

The present invention relates to a data integrating system wherein a number of loosely related numerical relationships are ordered about a central or nucleus data base file. This system consists of an improved methodology for correlating a large number of separate numerical functions in a manner that is internally consistent and significantly simpler and smaller than the prior art. These improvements result in smaller central processing unit (cpu) needs, thereby utilizing computer systems other than traditional mainframes. The initial embodiment of this invention effects an improved financial control and reporting system, but the invention is also applicable to non-financial systems.

In the present invention, a two step methodology has been developed which permits the application of the improved data handling system. This two step system results in the coordination of a large number of separate data manipulations which are performed in a manner that is internally consistent. In addition, the data files and/or computer memory required to perform these data manipulation tasks are smaller and easier to maintain than those in the prior art.

The two step methodology, which is described in further detail below, consists of arranging all of the loosely related numerical relationships in a consistent manner, and then developing a central data system which is arranged to provide common input variables to each numerical relationship. The loosely related numerical relationships are called satellite functions. Each satellite function contains one or more data manipulation algorithms which has been designed for a specific purpose. In the first step of this methodology, the input variables required for all satellite functions are reformatted so that all input variables can be represented by one, overall common set of input data variables. Each individual satellite function may require the total set or a sub-set of input data from the overall common set of input data variables.

In the second step of this methodology, the overall common set of input data variables is arranged into a common data base system. The common data base system is represented by a tabular matrix of rows and columns wherein the intersection of each row and column is designated a cell. The rows and columns are ordered so as to permit every transaction under consideration to be represented by one unique cell location. All cells are formatted internally in a common sequence such that each of the common set of input data variables described above is represented by a unique location or locations within each cell. These two steps are then integrated within a computing system or machine so as to permit the application of any satellite function from a keyboard device wherein all required input data for the satellite function is obtained from the common data base system. Data manipulation and output formats for each satellite function can be designed independently of these integrated satellite functions. These two steps are defined in further sub steps in the more detailed description below.

DESCRIPTION OF THE FIGURES

The present invention may be better understood and its inter-related objects and advantages will become apparent to those ordinarily skilled in the art by reviewing the accompanying drawings together with the description of the preferred embodiment. In these drawings, like references numerals refer to like elements in the several figures and wherein:

FIG. 2 is a schematic which describes the common data base system arrangement.

FIG. 3 is a schematic which describes a typical common format configuration for the data base cells.

DESCRIPTION OF THE PREFERRED EMBODIMENTS

Figure 1:
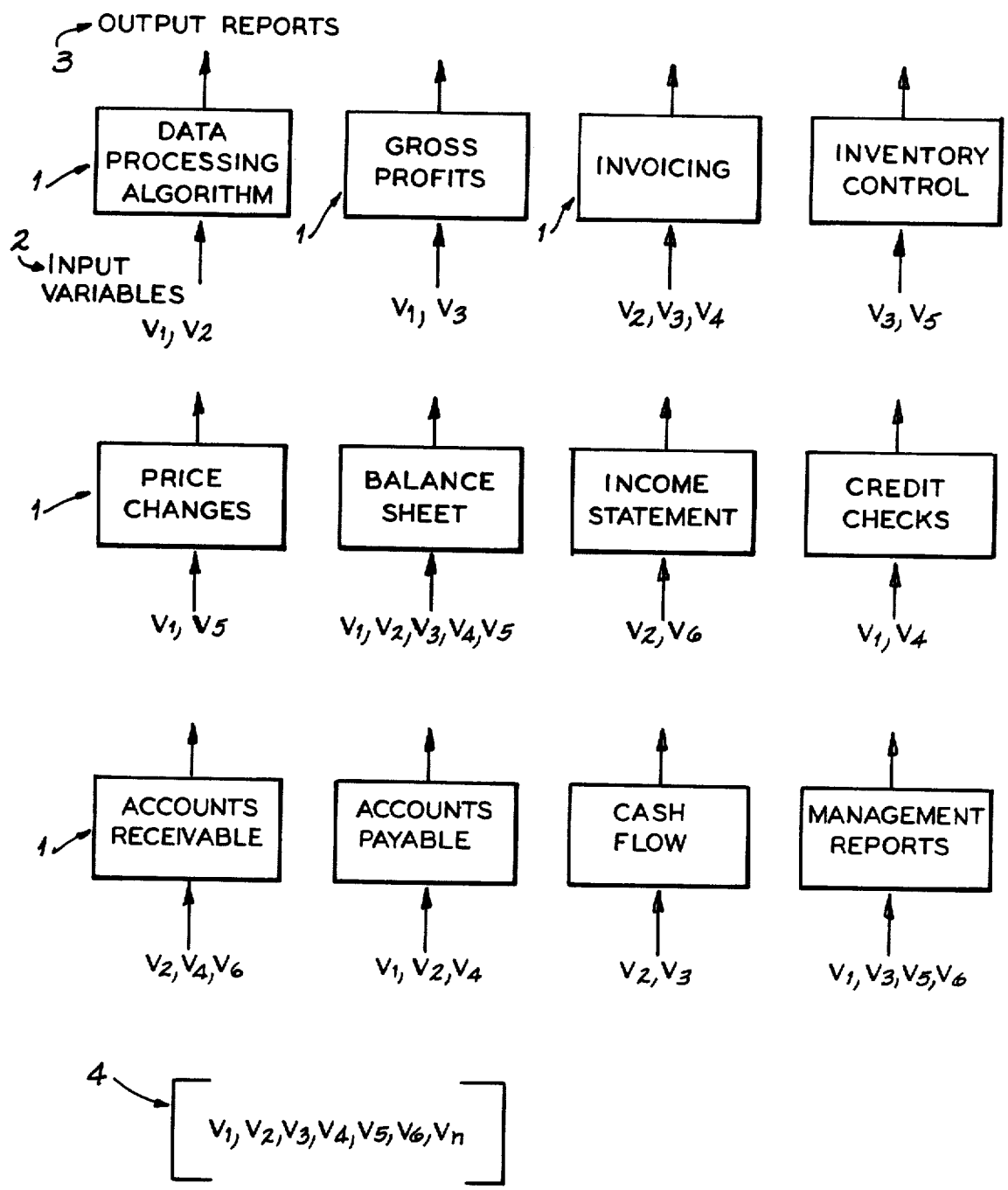
FIG. 1 is a schematic which describes the arrangement of a sample of satellite functions and a common set of input data variables.

Referring to FIG. 1, a number of related numerical relationships are schematically described. These loosely related numerical relationships are referred to as satellite functions 1. Each satellite function 1 contains one or more data manipulation algorithms which are desired for some particular purpose or purposes. These satellite functions 1 may be readily available software packages or they may be developed specifically for the purpose at hand. In FIG. 1, a number of typical business related financial systems are listed. This listing is provided as a sample to explain the invention and is not offered as a limitation. As with all software packages a number of input variables are required in order to utilize the data manipulation algorithm. In the invention, the input variables 2, are pre-arranged so that the listing of input variables for all of the satellite functions under consideration are reformatted such that all input variables 2 can be represented by one overall common set of data variables 4. In FIG. 1, by way of example, the common set 4 of input variables 2 are labeled $V_1$, $V_2$, $V_3$, $V_4$, $V_5$, $V_6$ up to a total of $V_n$. Each individual satellite function 1 may require as input the total set 4 of common input variables or any subset of variables from the total set 4.

Aside from the fact that all satellite functions 1 are reformatted so as to draw their input variables 2 from the common set 4 of all common input variables, each satellite function 1 can operate independently of all other satellite functions. Each individual satellite function 1 contains its own output report format 3 so as to satisfy the specific needs of each system user.

Once the total set 4 of common input variables, which represent all required inputs for all satellite functions, are defined, a central or common data base system 5 is developed as described schematically in FIG. 2 the common data base system 5 is arranged in a tabular form consisting of rows 6 and columns 7. The intersection of each row 6 and column 7 is designated a cell 8. As shown in FIG. 2, a unique cell location can be identified as (row number, column number). For example, the cell identified in the approximate center of FIG. 2 is designated (05,04) to signify row number 05, column number 04. The rows 6 and columns 7 are ordered so as to assign a unique cell location for each transaction under consideration. In the example shown, the rows 6 are ordered to represent all inventory items offered for sale. The columns 7 are ordered to represent every sell level for each inventory item. With this ordering, every transaction consisting of a specific inventory item and a specific sell level is mapped onto a unique cell location 8. The data base system 5 as shown in FIG. 2 is constructed so that additional inventory items and sell levels can be added, as required.

Several sample cells 8 are described schematically in FIG. 3. It is an object and advantage of the invention that all cells are internally formatted in an identical manner such that internal cell 8 locations are predesignated for each of the variables identified in the common set 4 of input variables. These input variables are the input data required by the satellite functions 1. In this example in FIG. 3, each cell is described schematically to show prearranged internal cell locations for input variables $V_1$, $V_2$, $V_3$, $V_4$, $V_5$, $V_6$ and $V_n$ where $V_n$ represents the last of the total number of variables in the common set 4 of input variables. In the financial management example described above, the first cell locations, $V_1$, represent the cost of the inventory item. The second cell locations, $V_2$, represent manufacturer's rebates. The additional cell locations can represent any other required data.

Figure 4:
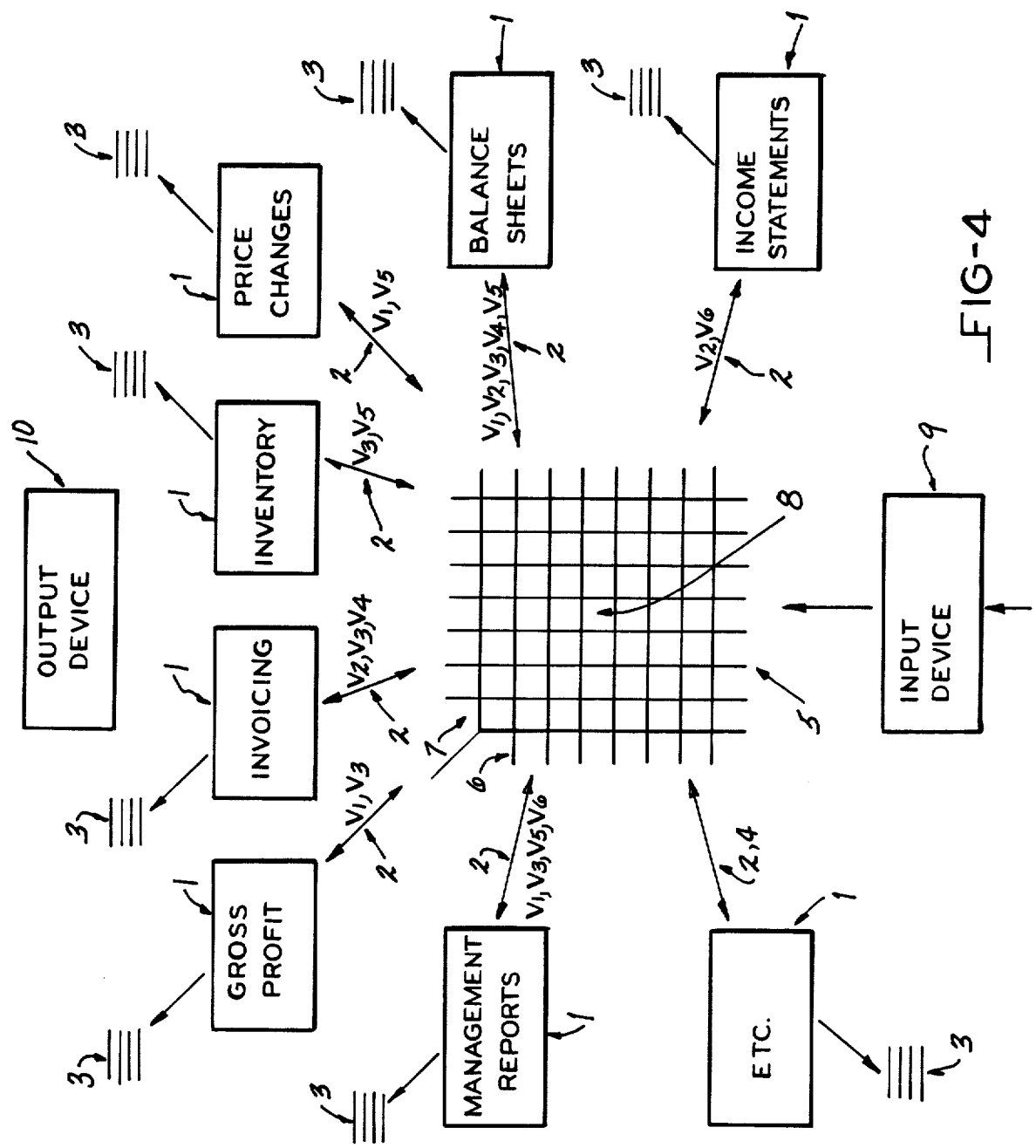
FIG. 4 is an integrated schematic which describes the entire system as a whole.

The entire invention is described in an integrated schematic in FIG. 4. FIG. 4 represents a computing system or machine that contains the entire invention. One or more input devices 9 are provided so as to permit the application or operation of any satellite function 1 from a keyboard input device 9 such as a remote keyboard terminal. All required input data 2 for each satellite function 1 is obtained from the common data base system 5. Alterations, modifications, and additions to the common data base system 5 are also implemented through the input device 9. Data manipulation for any specific function is implemented in an appropriate satellite function 1. Output data and output report formats 3 are incorporated within each satellite function 1 and are physically produced through a common output device 10. This integrated system is embodied within a digital computing system or machine. The invention in one case is incorporated into a TURBO MICRO 5 computer but can also be incorporated into any appropriate computer system.

While the preferred embodiments have been described and illustrated, various modifications and substitutions may be made without departing from the scope of this invention. It is to be understood, therefore, that the present invention has been described by way of illustration and not limitation.

What is claimed is:

1. A method for integrating a large number of related numerical relationships in a computer system, which comprise the steps of:

defining a number of satellite functions, said satellite functions containing one or more data manipulation algorithms each requiring a number of input variables; and arranging said input variables by reformatting said data manipulation algorithms so as to develop a common set of input data variables such that said common set of input data variables provide all of the required input data for said data manipulation algorithms; and arranging for said common set of input data variables to be entered into a tabular form of horizontal rows for each category of independent items such as inventory items; and establishing a set of columns for said horizontal rows of independent items wherein each of said columns represents a unique level of activity such as selling volume and is defined as a sell level, and wherein the intersection of each of said rows and columns are designated as a cell; and formatting each cell with predefined cell locations for each of said input variables such that all cells are pre-formatted in an identical manner to all other cells and specific input variables of like kind such as cost of goods is found in the identical location in each cell; and integrating the said satellite functions and said cells containing the common set of input data variables such that a transaction such as a sale of an inventory item is entered into said computing system by a keyboard or other input device and all required data manipulations in all of the affected said satellite functions are executed at the time of the said transaction and output reports or output report files are generated at the time of said transaction.

2. A method as recited in claim 1 wherein:

said satellite functions constitute a financial management system and;

said horizontal rows are arranged to represent inventory items or groups of items and;

said columns represent the sell levels for each inventory item or items.

* * * * *